Aug. 27, 1968   C. L. LEBLANC   3,399,018
ROLLED EYEGLASS LENS RIM CONSTRUCTION
Filed Oct. 2, 1963   3 Sheets-Sheet 1

INVENTOR
CONRAD L. LEBLANC
ATTORNEY

Aug. 27, 1968

C. L. LEBLANC 3,399,018

ROLLED EYEGLASS LENS RIM CONSTRUCTION

Filed Oct. 2, 1963

INVENTOR
*CONRAD L.*
*LEBLANC*

BY

ATTORNEY

INVENTOR
CONRAD L. LEBLANC
BY
ATTORNEY

United States Patent Office 3,399,018
Patented Aug. 27, 1968

3,399,018
ROLLED EYEGLASS LENS RIM
CONSTRUCTION
Conrad L. Leblanc, Leominster, Mass., assignor to Foster Grant Co., Inc., Leominster, Mass., a corporation of Delaware
Filed Oct. 2, 1963, Ser. No. 313,271
4 Claims. (Cl. 351—154)

ABSTRACT OF THE DISCLOSURE

This disclosure pertains generally to a pair of eyeglasses such as those of the prescription or sunglass type. A frame blank is disclosed which is provided with a specially designed lip for rolling over the edges of the lenses after they have been inserted. It has been found that the design and construction of this lip must be of a particular configuration in order to result in a finished frame having a substantially smooth front and rear face. The lip must surround at least a portion of the lens seat and the outer side of the lip should have a finished portion which extends forwardly and outwardly of the lip's apex and merge with a substantially concave second portion of the outer side of the lip. The concave portion then merges with the rear face of the frame blank.

---

This invention relates to a lens mounting blank and a method of assembling eyeglasses.

More particularly this invention is adapted for use in assembling eyeglasses such as sunglasses which are assembled on a mass production basis, although it may be adapted for use in the assembly of spectacles, goggles and the like. More specifically it is adapted for use in the assembly of eyeglasses having molded plastic frames.

Heretofore the lens have been inserted into the frames by one or more methods. One method of assembly of eyeglasses necessitates the steps of molding a frame blank, manually grooving the inner face of each lens mount, and manually inserting the lens into the grooves by springing the frame blank around the lens. While this manual method of assembly results in an eyeglass frame having a rear face which presents a smooth clean appearance, it nevertheless is a slow and costly process requiring skilled workers. Furthermore, in the manual assembling of eyeglasses, the symmetry of the frames is sometimes lost, with the result that the eyeglasses do not sit squarely on the face when worn.

Attempts to provide a faster and more economical method of assembly have resulted in a two-step process, viz., that of providing a lens mounting frame blank having lens seats formed therein, and lips formed on the rear face thereof; and rolling the lips over lenses which have been inserted in the seats. While this method eliminates the step of grooving the lens frame blank, it nevertheless results in a finished product which is not as attractive as those in which the lens are inserted in a groove. This is by reason of the fact that the lips, when rolled, still project outwardly from the rear surface and do not give the quality appearance of the hand-assembled glasses.

It is an object of the invention to overcome the above objections by providing a frame blank in which the lip is formed so as to be adapted to be rolled into lens holding position in such a manner as to present a substantially smooth front and rear face on the finally assembled eyeglasses.

Another object of my invention is to provide a method of assembling eyeglasses which reduces cost of manufacture while at the same time retaining the appearance of eyeglasses assembled by the costlier method.

It is a further object of the invention to provide a lens holding blank which is economical of manufacture, and which, when assembled, presents a pleasing appearance.

The foregoing and other objects are achieved by providing a lens frame blank having seating surfaces upon which lenses are placed, and confining walls for confining the lenses with respect to the lens seating surfaces so as to prevent movement of the lenses in the plane thereof. The frame blank carries lips projecting from the rear surface thereof and surrounding a greater portion of the lens seats. The inner side of the lip extends rearwardly of the confining wall. The outer side of the lip extends from the rearwardmost point on the inner side at the apex of the lip and commences in a forwardly and outwardly directed surface, said surface merging into a relatively large concave surface which in turn merges with the rear face of the frame blank. When the lip is so formed in this manner, it can be rolled over the lens without leaving the projection of the prior rolled lip eyeglasses.

By the above outlined apparatus and method several advantages are achieved. First an economical method of providing eyeglasses has been provided. Also a pleasing appearance is produced in the finished product, particularly in the use of the heavy modern day, horn-rim type of frame. Furthermore, glasses made by this method are not subjected to the distortion that is common to the hand-assembled glasses.

Other objects and features of the invention will become apparent by reference to the following specification and to the drawings.

Figure 1:
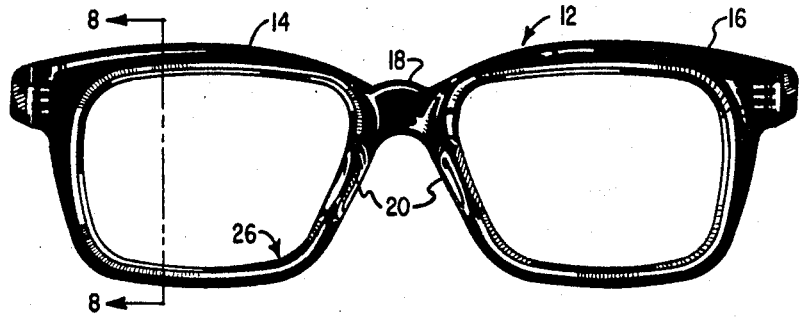
FIG. 1 is a rear view of the lens frame blank of my invention.

In the drawings, FIG. 1 shows a lens frame blank 12 which is presently formed of a thermoplastic material such as cellulose acetate or the like. The lens frame blank 12 is comprised of the usual frontal members 14, 16, nose bridge 18, nose rests 20, a front face 22, rear face 24, and lens seats 26.

Figure 8:
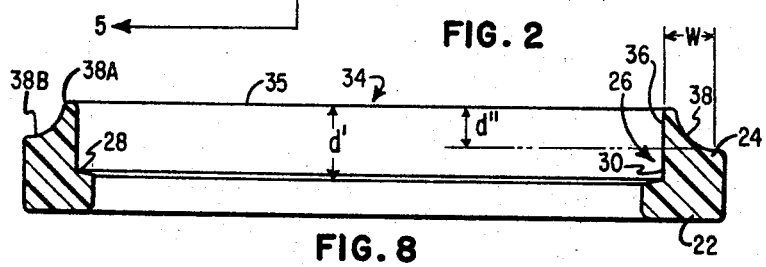
FIG. 8 is a section of the lens frame blank taken along line 8—8 of FIG. 1.

Referring more particularly to FIG. 8 it is seen that the lens seats 26 are formed of a seating surface 28 and a confining wall 30 extending at an angle to the seating surface 28. The confining wall 30 preferably diverges in the rearward direction to allow the lens 32 to be funneled onto the seating surface 28. A lip 34 (terminating in an apex 35) projects from the rear surface 24 of the lens frame blank 12 and surrounds a large portion of the seating 28 and wall 30.

The inner side 36 of the lip 34 extends rearwardly in substantially the same direction as the confining wall 30 and constitutes an extension of wall 30. The outer side 38 of the lip 34 is formed of a first portion 38a having a convex surface with a radius of curvature of between about .025 and .030 inch, preferably .025 inch; and a second concave portion 38b having a radius of curvature of between about .060 and .065, preferably .062 inch. The second portion 38b merges with the first portion 38a at a point about two-thirds of the distance between the rear face 24 of the blank and the apex 35 of the lip; and also merges with the rear face 24 of the lens blank frame. In a specific embodiment the thickness of the lens to be inserted is approximately .056 inch. The distance $d'$ from the seating surface 28 to the rearwardmost extremity of the lip 34 is approximately .190 inch. The lip 34 projects rearwardly from the rear surface 24 a distance $d''$ of approximately .085 inch leaving a confining wall depth of approximately .105 inch. The width $w$ of the lip 34 from the inner wall 36 to the point at which it merges with the rear surface 24 of the frame is approximately .090 inch. While in the preferred embodiment, the concave portion merges with the convex portion at a point about two-thirds of the distance between the rear face of the blank and the apex of the lip, it could extend a minimum of one-third of that distance and be joined to the concave surface by a substantially straight surface.

Figure 2:
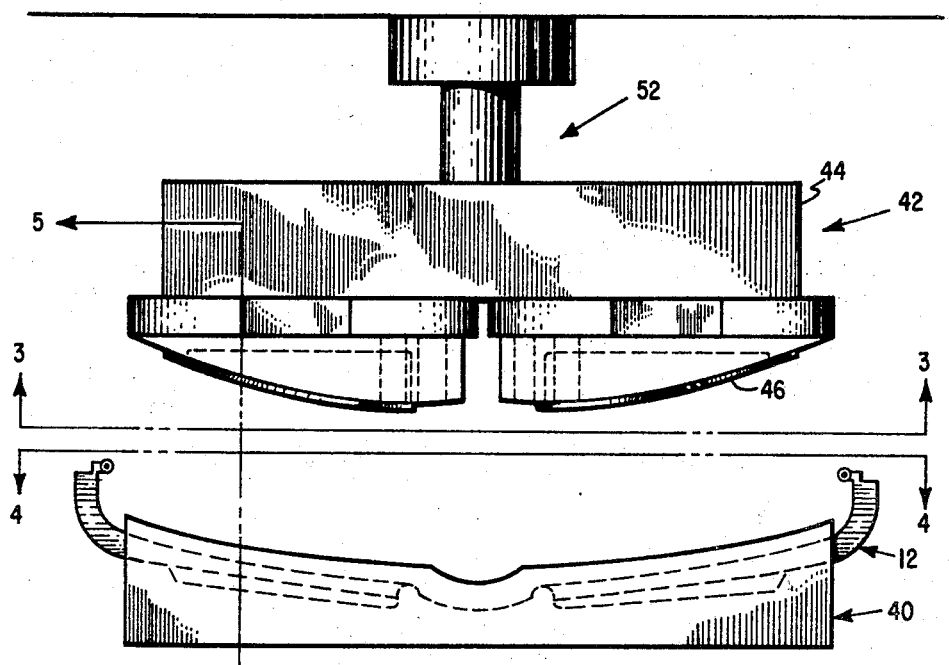
FIG. 2 is a side view of the molding tool and nest for carrying out the molding process.
Figure 10:
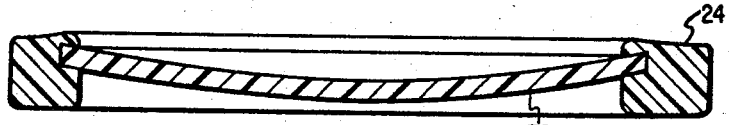
FIG. 10 shows a finished product of the present invention showing the smooth rear surface of the frames.
Figure 4:
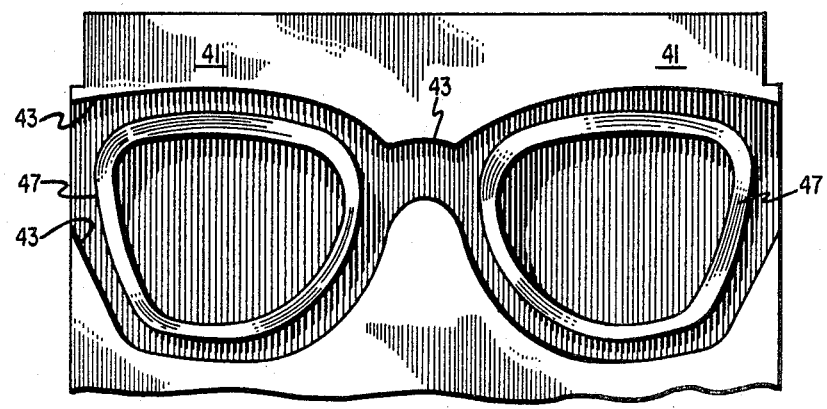
FIG. 4 is a plan view of the nest for the lens frame blank, taken in the direction of arrows 4—4 of FIG. 2.
Figure 3:
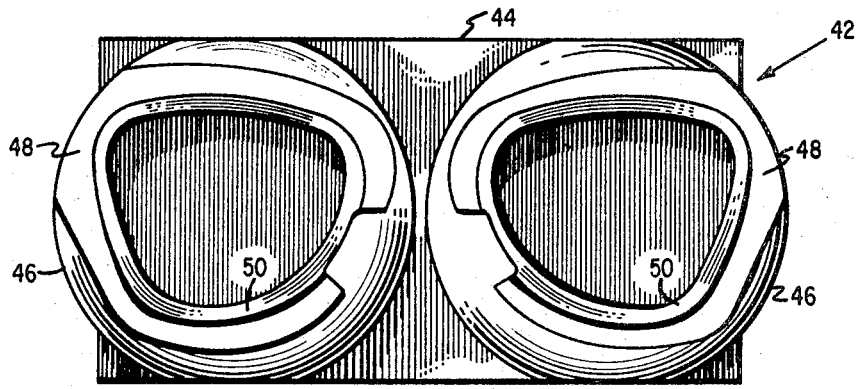
FIG. 3 is a bottom view of the molding tool taken in the directions of arrows 3—3 of FIG. 2.
Figure 5:
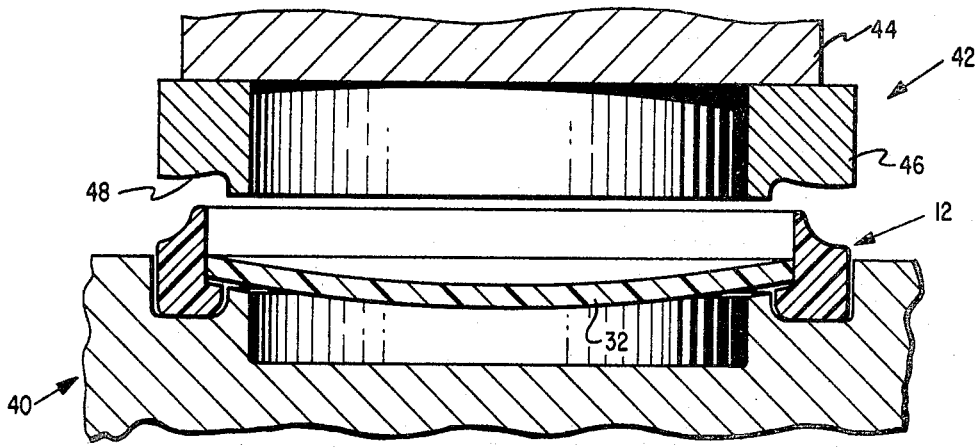
FIG. 5 is a cross-section of the molding device, taken along lines 5—5 of FIG. 2.
Figure 6:
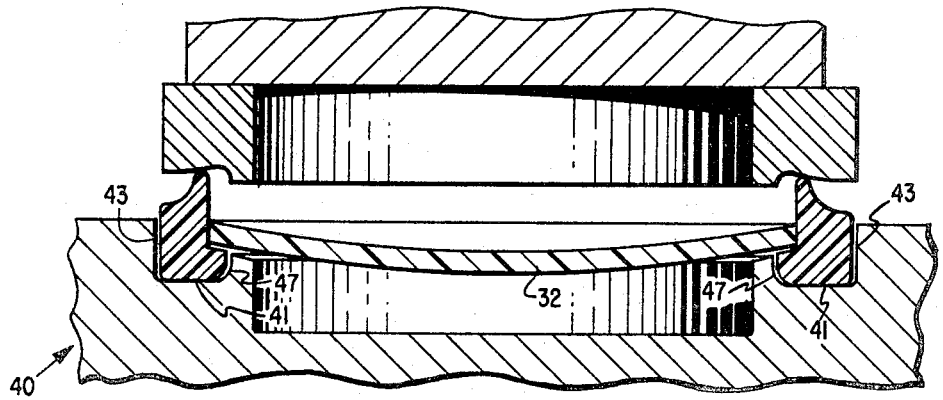
FIG. 6 is a view similar to FIG. 5 showing the rolling tool at the point of first engagement with the lip of the frame blank.
Figure 7:
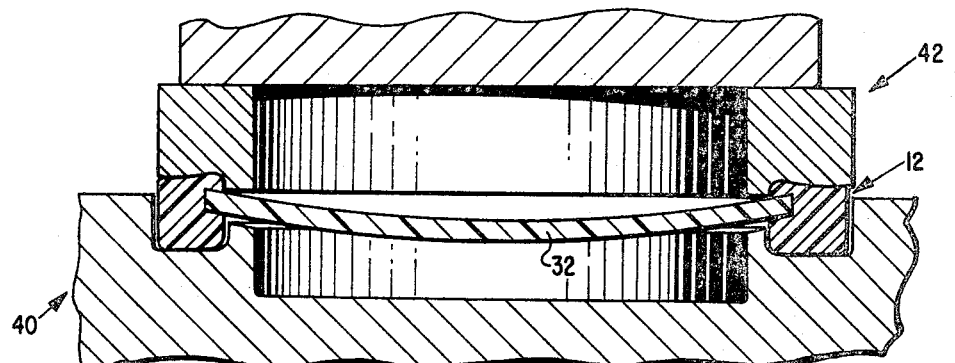
FIG. 7 is a view similar to FIG. 6 showing the rolling tool in its down position at the completion of the rolling process.

Turning to FIG. 2, it will be seen that the frames are rolled with the use of a standard press having a nest 40 of substantially the same configuration as the front face 22 of blank 12. This nest 40 is fixed and serves to support the frame blank 12 as the lip 34 is rolled. The nest 40 includes support surface 41, outside wall 43, and inner projection 47. These surfaces serve to locate the blank in the nest with respect to the tools 46. Cooperating with the nest 40 is a rolling mechanism 42. The rolling mechanism comprises supporting pads 44 which carry rolling tools 46. These tools have highly polished surfaces 48 which roll the lips 34 from the position of FIG. 8 into the position shown in FIG. 10 (as illustrated in FIGS. 5–7).

The operation of the method is as follows. A blank 12 of the type shown in FIG. 1 is molded by conventional molding methods, preferably by injection molding. Before rolling, the blank 12 is normally heated to the plastifying temperature. This temperature will vary depending on the plastifying range of the plastic used. The plastifying range is the range within which the plastic is susceptible in reshaping. Subsequent to heating, the frame blank 12 with the lenses 32 in place in their seats 28, is inserted into the nest 40 (FIG. 5). After the blank 12 is in place, the rolling mechanism 42 is lowered, and the rolling tools 46 make contact with the apices 35 of the lips 34 (FIG. 6). Further downward movement of the rolling tools 46 forces the lips to slide with respect to the polished surfaces 48 of the tool, and to be formed into their ultimate position shown in FIG. 7 and FIG. 10. The rolling mechanism is then raised and the assembled frames removed. While the tool actuator has been shown as a piston and cylinder 52, the tool could be actuated by means of an eccentric or screw drive or the like without departing from the scope of the invention. Also the molding and rolling steps could be combined into a single operation.

Figure 9:
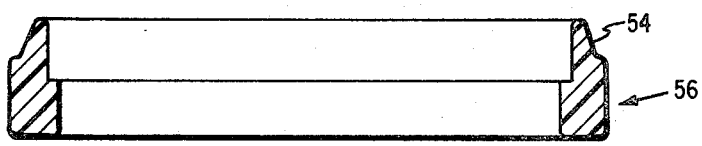
FIG. 9 is a view similar to FIG. 8 showing a section of a prior art lens frame blank.
Figure 11:
FIG. 11 shows a finished product of the prior art method showing the lip projection on the rear surface of the frames.

FIG. 9 shows the lip 54 of the prior art frame blank 56. FIG. 11 shows how the rear face 58 of a molded prior art blank 56 still carries a projection 60 which does not give the smooth clean appearance of the applicant's device which simulates the more expensive grooved frames.

Thus it will be seen that the invention has provided an improved lens frame blank and method of assembling eyeglasses which has the advantage of being economical to manufacture while at the same time maintaining the esthetic appearance of the more expensive grooved frames.

Many alterations and changes may be made without departing from the spirit and intended scope of the invention as set forth in the appended claims.

What is claimed is:

1. A device comprising, a lens frame blank having front and rear faces; at least one lens seat for supporting a lens in said frame blank; said lens seat including a seating surface and a confining wall extending from said seating surface; a lip projecting from one of said front and rear faces and surrounding at least a portion of said lens seat; said lip having an inner side and an outer side; said inner side of said lip extending from said one of said front and rear faces in substantially the same direction as the confining wall; said outer side of said lip having a first portion which extends outwardly of the apex of said lip and towards said one of said front and rear faces, and merges with a substantially concave second portion of said outer side of said lip; said concave portion merging with said one of said front and rear faces of the frame blank and extending over at least about one-third of the distance between said one of said front and rear faces of the blank and the apex of the lip, whereby when the lip is rolled over a lens inserted in said seat, the lens is held in position in said frame, and said one of said front and rear faces of the frame surrounding the lens is substantially flat.

2. A device comprising, a lens frame blank having front and rear faces; a lens seat for supporting lens in said frame blank; said lens seat including a seating surface and a confining wall extending rearwardly of said seating surface; a lip projecting from said rear face and surrounding at least a portion of said lens seat; said lip having an inner side and an outer side, said inner side of said lip extending rearwardly of said rear face in substantially the same direction as the confining wall; said outer side having a first substantially convex portion which extends forwardly and outwardly of the apex of said lip, and merges with a substantially concave second portion of said outer side of said lip; said concave surface merging with the rear face of the frame blank and extending rearwardly about two-thirds of the distance between the rear face of the blank and the apex of the lip; whereby when the lip is rolled over the lens inserted in said seat, the lens are held in position in said frame, and said rear face of the frame surrounding the lens is substantially flat.

3. A device comprising; a lens frame blank having front and rear faces, lens seats for supporting lenses in said frame blank; each of said lens seats including a seating surface and a confining wall extending substantially normal to said seating surface; lips projecting from said rear face and substantially surrounding said each of said lens seats; each of said lips having an inner side and an outer side; said inner side constituting an extension of said wall surface; said outer side commencing in an arcuate convex surface having a radius of curvature of between about .025 and about .030 inch, and merging into an arcuate concave surface having a radius of curvature of between about .060 and about .065 inch; said concave surface also merging tangentially with said rear face of said frame blank; whereby when lenses are inserted into said seats and the lips are rolled, over said lenses, the lenses are held in position on said frame, and the rear face of the frame surrounding the lenses is substantially flat.

4. A lens mounting frame blank having front and rear faces; lens seats for supporting lenses in said frame blank; each of said lens seats including a seating surface and a confining wall extending rearwardly from said seating surface for a distance of approximately .105 inch; lip means projecting from said rear face a distance of approximately .085 inch and surrounding a large portion said lens seats; one side of said lip means constituting an extension of said wall surface; the other side of said lip commencing in an arcuate convex surface having a radius of curvature of between .025 and .030 inch, said convex surface merging with a concave surface having a radius of curvature of approximately .062 inch whereby when the lip means are rolled over lenses inserted in said seats, the lenses are held in position on said frame and the rear face of the frame surrounding the lenses is substantially flat.

References Cited

UNITED STATES PATENTS

| | | | |
|---|---|---|---|
| 2,132,106 | 10/1938 | Graham | 351—86 |
| 2,431,238 | 11/1947 | Friedman | 350—178 X |
| 2,500,897 | 3/1950 | Friedman | 264—249 X |

FOREIGN PATENTS 512,419   9/1939   Great Britain.

DAVID H. RUBIN, *Primary Examiner.*